United States Patent
Park et al.

(10) Patent No.: US 11,997,405 B2
(45) Date of Patent: May 28, 2024

(54) ELECTRONIC DEVICE INTEGRATING PHASE DIFFERENCE DETECTION AND IMAGING AND METHOD FOR CONTROLLING THE SAME

(71) Applicant: Samsung Electronics Co., Ltd., Gyeonggi-do (KR)

(72) Inventors: Jaehyoung Park, Gyeonggi-do (KR); Shuichi Shimokawa, Gyeonggi-do (KR); Dongsoo Kim, Gyeonggi-do (KR); Kawang Kang, Gyeonggi-do (KR); Yunjeong Kim, Gyeonggi-do (KR); Inah Moon, Gyeonggi-do (KR); Yeotak Youn, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 17/856,131

(22) Filed: Jul. 1, 2022

(65) Prior Publication Data
US 2023/0007197 A1 Jan. 5, 2023

Related U.S. Application Data

(63) Continuation of application No. PCT/KR2022/009558, filed on Jul. 1, 2022.

(30) Foreign Application Priority Data

Jul. 2, 2021 (KR) .................. 10-2021-0087442

(51) Int. Cl.
*H04N 25/704* (2023.01)
*H04N 25/76* (2023.01)

(52) U.S. Cl.
CPC ........... *H04N 25/704* (2023.01); *H04N 25/76* (2023.01)

(58) Field of Classification Search
CPC .... H04N 25/704; H04N 25/76; H04N 23/672; H04N 25/11; H04N 25/75; H01L 27/14627; G02B 7/34
See application file for complete search history.

(56) References Cited

U.S. PATENT DOCUMENTS

| 6,714,242 B1 | 3/2004 | Kobayashi |
| 2013/0308040 A1 | 11/2013 | Ishii |

(Continued)

FOREIGN PATENT DOCUMENTS

| CN | 106097898 | 11/2016 |
| CN | 109905600 | 6/2019 |

(Continued)

OTHER PUBLICATIONS

International Search Report dated Sep. 29, 2022 issued in counterpart application No. PCT/KR2022/009558, 10 pages.

*Primary Examiner* — Albert H Cutler
(74) *Attorney, Agent, or Firm* — The Farrell Law Firm, P.C.

(57) ABSTRACT

An electronic device is provided. The electronic device includes a camera with an image sensor including a plurality of image pixels arranged in a first direction and a second direction orthogonal to the first direction, for converting light incident on a plurality of micro-lenses into an electrical signal, performing a first correlation calculation for phase difference detection in the first direction based on the electrical signal, and outputting image data including a first phase difference correlation calculation value, an ISP configured to perform a second correlation calculation for phase difference detection in the second direction using phase difference information about the image data, and a driver configured to adjust a focus of the camera based on the first phase difference correlation calculation value for the first (Continued)

direction and a second phase difference correlation calculation value for the second direction.

20 Claims, 12 Drawing Sheets

(56) References Cited

U.S. PATENT DOCUMENTS

| | | | |
|---|---|---|---|
| 2015/0009383 A1* | 1/2015 | Fujii | H04N 25/134 |
| | | | 348/302 |
| 2016/0044229 A1 | 2/2016 | Hamada | |
| 2016/0269667 A1 | 9/2016 | Ono | |
| 2017/0237895 A1* | 8/2017 | Sakurabu | H04N 23/672 |
| | | | 348/353 |
| 2018/0017759 A1 | 1/2018 | Sakaguchi | |
| 2018/0197442 A1 | 7/2018 | Song et al. | |
| 2019/0082130 A1* | 3/2019 | Li | H01L 27/14645 |
| 2019/0320122 A1 | 10/2019 | Hasegawa | |
| 2020/0280659 A1* | 9/2020 | Galor Gluskin | H04N 25/533 |

FOREIGN PATENT DOCUMENTS

| | | |
|---|---|---|
| CN | 112866511 | 5/2021 |
| EP | 2 434 457 | 3/2012 |
| JP | 2018-010245 | 1/2018 |
| JP | 2019-184887 | 10/2019 |
| KR | 1020160016466 | 2/2016 |
| KR | 1020170067634 | 6/2017 |
| WO | WO 2013/171840 | 11/2013 |

* cited by examiner

ELECTRONIC DEVICE INTEGRATING PHASE DIFFERENCE DETECTION AND IMAGING AND METHOD FOR CONTROLLING THE SAME

CROSS-REFERENCE TO RELATED APPLICATION(S)

This application is a Bypass Continuation application of PCT International Application No. PCT/KR2022/009558, which was filed on Jul. 1, 2022, and claims priority to Korean Patent Application No. 10-2021-0087442, which was filed on Jul. 2, 2021, the entire content of each of which is incorporated herein by reference.

BACKGROUND

1. Field

The disclosure relates generally to an electronic device for automatically focusing and capturing an object, and a method for controlling the same.

2. Description of the Related Art

To shoot a clear stationary image (e.g., a still image) or moving picture (e.g., a video), accurate focusing on an object may be critical to an object capturing device (e.g., a camera).

Object capturing devices perform focusing by contrast auto-focus or phase auto-focus.

Contrast auto-focus makes use of the characteristic that, when exactly in focus, the outline of the object is clear so that contrast increases but, when out of focus, it is blurred causing contrast to drop. Contrast auto-focus measures the contrast of a specific portion of the image forming on an imaging element (e.g., an image sensor) while moving the lens assembly, e.g., back and forth and may determine the maximum contrast as being in focus.

Phase auto-focus measures how much and in what direction the offset is made from a center image obtained through the imaging element using a phase difference between two or more distance measurement points.

A conventional method providing contrast auto-focus exhibits high focusing accuracy by detecting the focus of the real image actually forming on the imaging element. However, this method measures contrast after the lens is moved (i.e., lack of directivity) and thus suffers from slow focus detection. While phase auto-focus is capable of quicker focus detection than contrast auto-focus, with its predictability of the moving direction of the lens assembly (i.e., this has directivity), it may still cause errors because it outputs phase data through a sensor separately prepared for phase difference detection. Thus, a hybrid auto-focus, which combines contrast auto-focus and phase auto-focus, is sometimes used.

Object capturing devices, such as compact film cameras, single lens reflex (SLR) cameras, and digital single lens reflex (DSLR) cameras, which apply digital technology to SLR. Mirrorless cameras reduce size by removing the reflection mirror and the pentaprism from the DSLR have been developed. An attempt has been made to integrate a phase difference detection sensor into the imaging element while adopting phase auto-focus in focusing of the object capturing device.

Integration of a phase difference detection sensor into an imaging element may allow for rapid phase auto-focus ("phase difference detection AF"), which is applied to mirrorless cameras and to other types of cameras.

Integration of a phase difference detection sensor into an imaging element comes in a pixel masking structure which includes phase difference detection pixels formed by hiding half of one photodiode provided corresponding to one micro-lens by metal and a dual pixel structure, which detects the phase difference using an image pixel provided with two photodiodes (2PD) corresponding to one micro-lens, i.e., a 2PD pixel structure. The pixel masking structure has phase difference detection pixels separate from image pixels in one sensor and thus has the drawback that it loses as many image pixels as the phase difference detection pixels. In that sense, the 2PD pixel structure, which implements phase difference functions using the image pixels as they are, may be more advantageous than the pixel masking structure in obtaining a bright image. However, although in the 2PD pixel structure, the pixel corresponding to one micro-lens is divided into two photodiodes for implementing a phase difference, the readout-to-resolution may be reduced in performing a re-mosaic because the horizontal-vertical aspect ratio does not fit in the phase of displaying the image-related data obtained through the imaging element, as an image or video, to be actually perceived by the user.

Thus, a pixel structure may be applied which is provided with four photodiodes (4PD) corresponding to one micro-lens, i.e., a "4PD pixel structure", not to reduce the readout-to-resolution, relative to the above-described 2PD pixel structure. In the 2PD pixel structure, two photodiodes divide one pixel into two linear symmetric left and right sub-pixels. In the 4PD pixel structure, however, four photodiodes may divide one pixel into four sub-pixels which are point-symmetric in the upper/lower/left/right directions. The 4PD pixel structure has advantages over the 2PD pixel structure in that it may convert each photodiode into a Bayer color filter form during the re-mosaic and is thus able to restore resolution.

However, due to a difficulty in application of the re-mosaic technique, the 4PD pixel structure is not yet widely adopted. In particular, there is no technical rule established, such as simultaneously performing phase difference detection in one direction (e.g., horizontal phase difference detection) followed by phase difference detection in the orthogonal direction (e.g., vertical phase difference detection).

SUMMARY

The disclosure has been made to address at least the above-mentioned problems and/or disadvantages and to provide at least the advantages described below.

An aspect of the disclosure provides an electronic device including at least one camera, the electronic device including an image sensor including a plurality of image pixels arranged in a first direction and a second direction orthogonal to the first direction, converting light incident on a plurality of micro-lenses into an electrical signal, performing a first correlation calculation for phase difference detection in the first direction based on the electrical signal, and outputting image data including a first phase difference correlation calculation value, an image signal processor (ISP) configured to perform a second correlation calculation for phase difference detection in the second direction using phase difference information about the image data; and a driver configured to adjust a focus of the at least one camera based on the first phase difference correlation calculation value for the first direction and the second phase difference correlation calculation value for the second direction.

Another aspect of the disclosure provides a method for controlling an electronic device including a camera, an image sensor and at least one processor, the method comprising performing, using the image sensor, a first correlation calculation for phase difference detection in a first direction on a plurality of image pixels included in an image sensor, the image sensor being configured to collect light incident on a lens, and the plurality of image pixels being arranged in the first direction and a second direction orthogonal to the first direction, performing, using at least one processor, a second correlation calculation for phase difference detection in the second direction, and adjusting a focus of the camera based on a first phase difference correlation calculation value for the first direction and a second phase difference correlation calculation value for the second direction.

In the present disclosure, phase difference correlation calculation computation in the first direction perpendicular to the second direction, which is readout direction, may be performed without frame memory. Thus, computation speed is increased, and focusing speed of an electronic device including a camera module is significantly increased.

According to some embodiments, in performing phase difference detection on a 4PD pixel structure, the phase difference detection of the 2PD pixel structure may be applied to perform phase difference detection in the horizontal direction followed by phase difference detection in the vertical direction using a line memory or frame memory obtained by the phase difference detection in the horizontal direction. In such a case, since the vertical phase difference detection is performed after the horizontal phase difference detection, operation speed may reduce. A 4PD pixel structure which adopts such phase difference detection method may have difficulty in rapidly synchronizing the result of the horizontal phase difference detection and the result of the vertical phase difference detection.

Therefore, the present disclosure provides an electronic device capable of performing phase difference detection in a direction and its orthogonal direction without delay in detecting a phase difference using a 4PD pixel structure and a method for controlling the same.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
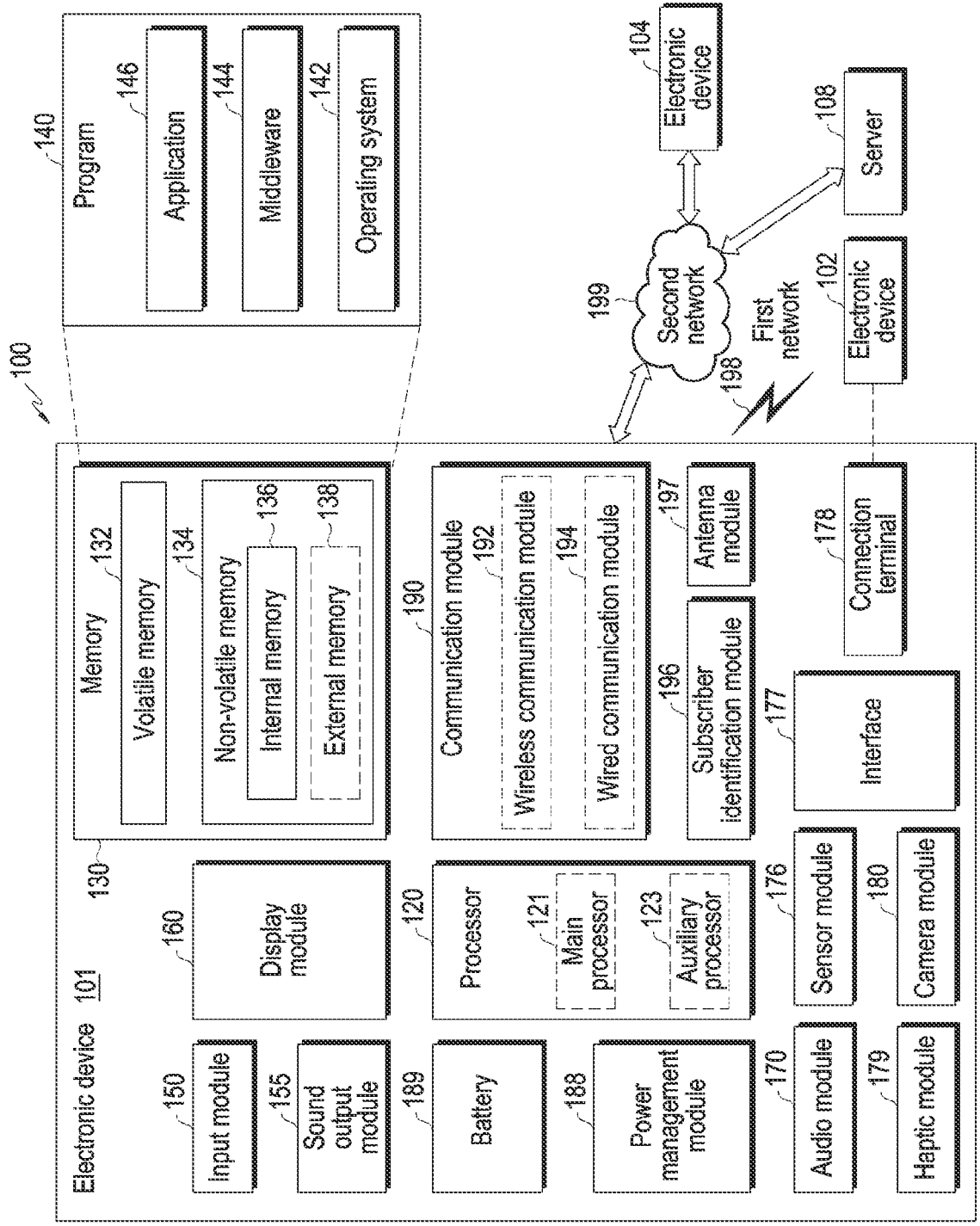
FIG. 1 illustrates an electronic device in a network environment according to an embodiment.

Hereinafter, embodiments of the disclosure will be described in detail with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 illustrates an electronic device in a network environment according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network, or a combination of two or more thereof, but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image capturing elements (image sensors), ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5$^{th}$ generation (5G) network, a next-generation communication network, the Internet, or a computer network (e.g., a LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197. According to various embodiments, the antenna module 197 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
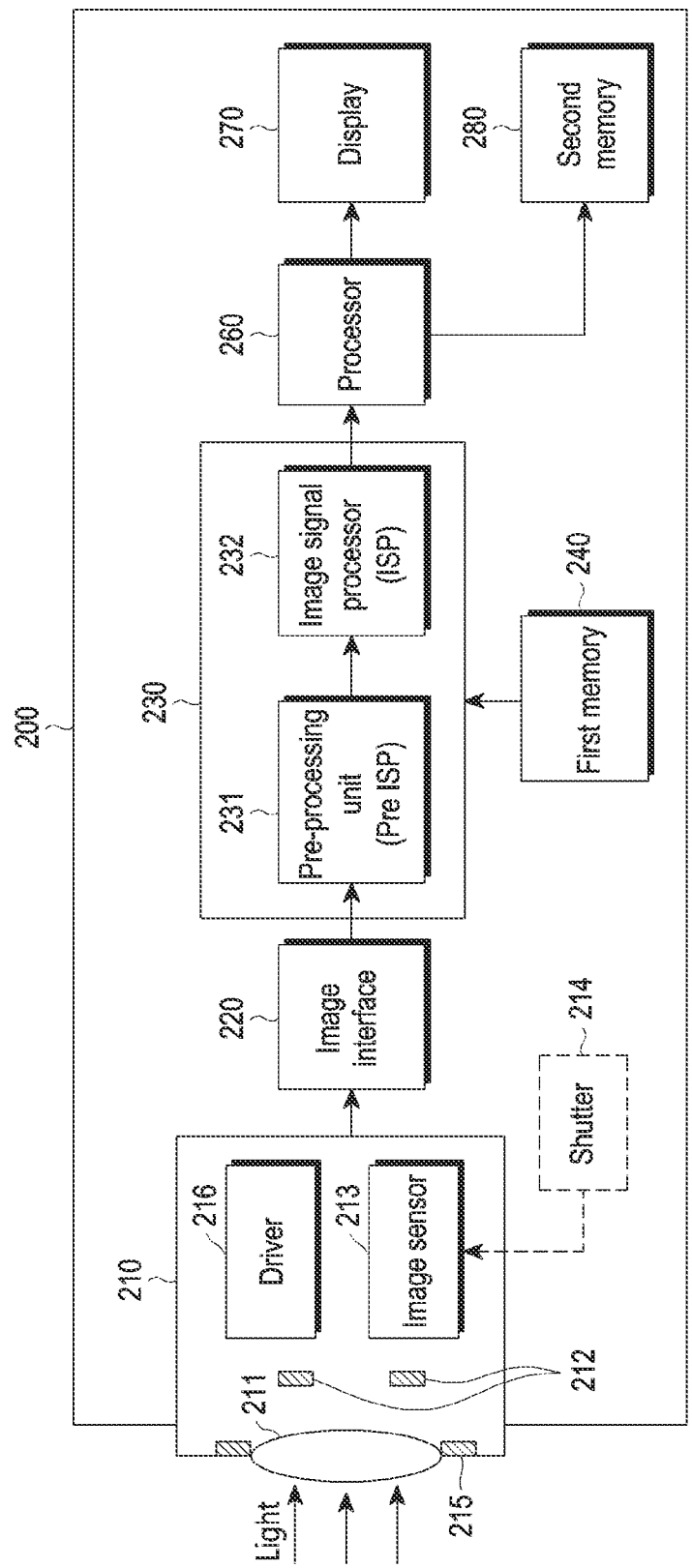
FIG. 2 illustrates components of an electronic device according to an embodiment.

FIG. 2 is a block diagram illustrating components of an electronic device according to an embodiment.

Referring to FIG. 2, an electronic device 200 (e.g., a camera) collects the light reflected by an object and capture a photo (or video). The electronic device 200 includes an image capture part 210, an image interface 220, an image processing part 230, a first memory 240, a processor 260, a display 270, and a second memory 280. The image capture part 210 may constitute a camera. An ISP 232 and the processor 260 may constitute at least one processor.

The image capture part 210 may include a lens part 211, a diaphragm 212, an imaging element 213 (i.e., image sensor), a shutter 214, and drivers 215 and 216.

The lens part 211 collects light reflected from the object that reaches the electronic device 200. The lens part 211 may include at least one lens, and for example, may be implemented as a lens assembly in which a plurality of lenses are aligned in an optical axis direction. In this case, the image capture part 210 may be, e.g., a dual-camera, a 360-degree camera, or a spherical camera. The lenses included in the lens assembly may have the same lens attributes (e.g., angle of view, focal length, auto-focus, f-number, or optical zoom), or at least one lens may have at least one different lens attribute than another lens. The lens assembly may include, for example, a wide-angle lens or a telephoto lens. The amount of light (light quantity) collected through the lens part 211 may be adjusted through the diaphragm 212, and that light that has passed through the diaphragm 212 may reach the image sensor 213. In the embodiment shown in FIG. 2, the diaphragm 212 is illustrated as being separated from the lens part 211. Alternatively, the diaphragm 212 may be integrated into the lens part 211.

The image sensor 213 may include a pixel array in which a plurality of image pixels are two-dimensionally arranged in a grid shape. One of a plurality of reference colors may be allocated to each of the plurality of image pixels. The plurality of reference colors may include, e.g., red-green-blue (RGB), red-green-blue-white (RGBW), cyan-magenta-yellow (CMY), cyan-magenta-yellow-black (CMYK), red-yellow-blue (RYB), and RGB IR ray (RGBIR). A plurality of micro-lenses are disposed on a side closer to the object in the optical axis direction with respect to the plurality of image pixels. The image sensor 213 may generate a digital signal (or an electrical signal) based on the light reflected from the object and may generate digital image data (hereinafter, simply referred to as "image data") based on the electrical signal. The image sensor 213 may include one selected from image sensors having different attributes, such as an RGB sensor, a black-and-white (BW) sensor, an IR sensor, or a ultraviolet (UV) sensor, a plurality of image sensors having the same attribute, or a plurality of image sensors having different attributes. As the image sensor 213, e.g., charge coupled device (CCD) or complementary metal oxide semiconductor (CMOS) may be used.

The image sensor 213 may include a photodiode (PD), a transfer transistor (TX or transfer gate), a reset transistor (RX or reset gate), and a floating diffusion (FD) node. The PD may generate and accumulate photo charges corresponding to the optical image of the object. The TX may transmit the photo charges focused on the PD to the FD node in response to a transmission signal. The RX may discharge the charges stored in the FD node in response to a reset signal. Charges stored in the FD node are output before the reset signal is applied. In this case, correlated double sampling (CDS) may be performed, and the CDS-ed analog signal may be converted into a digital signal through an analog-to-digital converter (ADC) and/or an analog front end (AFE). As an example, the image sensor 213 of the disclosure may include four photodiodes in a pixel corresponding to one micro-lens (e.g., a 4PD pixel).

The shutter 214 may adjust the time during which the image sensor 213 is exposed to light. For example, when the shutter 214 operates slowly, more light may be incident on the image sensor 213 and, when the shutter 214 operates quickly, less light may be incident on the image sensor 213.

The drivers 215 and 216 may adjust the position of the lens part 211, the diaphragm 212, or the image sensor 213. The drivers 215 and 216 may include a first driver 215 and a second driver 216. For example, the first driver 215 may move the lens part 211 or the diaphragm 212 in parallel to the optical axis direction. By implementing an auto-focusing operation of the image capture part 210 through the first driver 215, the focus of the light imaged on the image sensor 213 may be adjusted. Further, for example, the second driver 216 may adjust the position of the lens part 211 or the image sensor 213, preventing a shake that occurs when the user manipulates the image capture part 210. The second driver 216 may move in a particular direction, or control (e.g., adjust the read-out timing of), the image sensor 213 or at least one lens included in the lens assembly to at least partially compensate for a negative effect (e.g., image blurring) on a captured image, which is caused by the motion of the image capture part 210 or the electronic device 200 including the image capture part 210, in response to the motion. The second driver may be implemented as, e.g., an image stabilizer or an optical image stabilizer and may detect the motion using a gyro sensor or an acceleration sensor disposed inside or outside the image capture part 210.

The image interface 220 may be disposed between the image sensor 213 and the image processing part 230 to perform interfacing. The data output from the image sensor 213 through the image interface 220 may be transmitted to the image processing part 230. Depending on the configuration of the electronic device 200, the image interface 220 may be included in the image processing part 230. Further, depending on the configuration of the electronic device 200, the image interface 220 may be omitted or another interface may be additionally provided.

The memories 240 and 280 may at least temporarily store at least a portion of the image obtained through the image sensor 213 for a next image processing task, or may store commands or data related to at least one other component (e.g., the image processing part 230) of the electronic device 200. For example, when image capturing is delayed due to shutter lag or multiple images are quickly captured, a raw image obtained (e.g., a high-resolution image) may be stored in the first memory 240 or the second memory 280, and its corresponding copy (e.g., a low-resolution image) may be previewed through a display device. Thereafter, if a specified condition is met (e.g., by a user's input or system command), at least part of the raw image stored in the first memory 240 or the second memory 280 may be obtained and processed, for example, by the ISP 232. The first memory 240 or the second memory 280 may be configured as at least part of the memory (e.g., the memory 130 of FIG. 1) of the electronic device 200 or as a separate memory that is operated independently from the memory.

The memories 240 and 280 may include a first memory 240 and a second memory 280 that are separated from each other as shown in FIG. 2. The first memory 240 may store at least one correction data (e.g., white balance correction data, gamma correction data, knee correction data, etc.). For example, the at least one correction data may be stored in a look-up table (LUT) format. The second memory 280 may be a non-volatile memory (e.g., a flash memory) and may store the image data generated by the image processing part 230. In FIG. 2, for convenience of description, the memories 240 and 280 are illustrated as separate components depending on their functions. However, without limited to those described, it should be noted that the memories 240 and 280 may also be implemented as a single component.

The image processing part 230 performs various processing on the image data output from the image sensor 213. The image processing part 230 may perform image processing (e.g., depth map generation, three-dimensional (3D) modeling, panorama generation, feature point extraction, image mixing, or image compensation (e.g., noise canceling, resolution adjustment, luminance adjustment, blurring, sharpening, or softening)) on an image obtained through the image sensor 213 or an image stored in the memory (e.g., the first memory 240). Additionally or alternatively, the image processing part 230 may perform control (e.g., exposure time control or read-out timing control) with respect to at least one (e.g., the image sensor 213) of the components included in the image capture part 210. An image processed by the image processing part 230 may be stored back in the first memory 240 or the second memory 280 for further processing, or may be provided to an external component (e.g., the memory 130, the display device 160, the electronic device 102, the electronic device 104, or the server 108) outside the image capture part 210. The image processing part 230 may include a pre-processing unit (e.g., a pre-ISP) 231 and ISP 232. The pre-processing unit 231 may perform a function, such as image matching or gamma processing. For example, when there is a shake among a plurality of continuously captured images, the pre-processing unit 231 may remove or reduce the shake component through an image matching process. The ISP 232 may generate an entire image signal by correcting and synthesizing the signal received from the pre-processing unit 231. The pre-processing unit 231 may be integrated with the ISP 232 to constitute the image processing part 230.

The image processing part 230 may be configured as at least part of the processor 260, or as a separate processor that is operated independently from the processor 260. For example, the pre-processing unit 231 and the ISP 232 of the image processing part 230 may be integrated into the processor 260. In contrast, when the image processing part 230 is configured as a separate processor different from the processor 260, the images processed by the image processing part 230 may be displayed through the display device 160, as they are or after undergoing additional image processing.

The image processing part 230 may generate a signal for controlling the lens part 211 or the image sensor 213 in addition to analyzing and calculating the image data output from the image sensor 213. For example, the image processing part 230 may generate a signal for controlling the first driver 215 to move the lens part 211 in the optical axis direction or generate a signal for controlling the second driver 216 to move the lens part 211 or the image sensor 213 for anti-shake purposes.

The processor 260 included in the electronic device may include one or more of a CPU, an AP, or a CP. The processor 260 may perform control on at least one other component included in the electronic device 200, and/or perform an operation or data processing relating to communication. As described above, the processor 260 may include the image processing part 230 as at least a portion of the processor 260 or may operate as a separate processor operating independently from the image processing part 230.

The display 270 may include, e.g., a liquid crystal display (LCD), a light emitting diode (LED) display, an organic light emitting diode (OLED) display, or a microelectromechanical systems (MEMS) display, or an electronic paper display. The display 270 may display, e.g., an image captured by the image capture part 210 or an image whose white balance is corrected by the image processing part 230 under the control of the processor 260. The display 270 may include a touchscreen and may receive, e.g., a touch, gesture, proximity or hovering input using an electronic pen or a body portion of the user. The following description of embodiments exemplifies the pre-processing unit 231 included in at least a portion of the ISP 232 and thus assumes that the ISP 232 has substantially the same configuration as the image processing part 230. The at least one processor, as used herein may mean that the image processing part 230 is provided as at least a portion of, or separately from, the processor 260. Accordingly, the ISP 232 is a separate processor operating independently form the processor 260, as an example. However, this is merely an example and a combination of the image processing part 230, the ISP 232, and the processor 260 is not limited to any one type.

Figure 3:
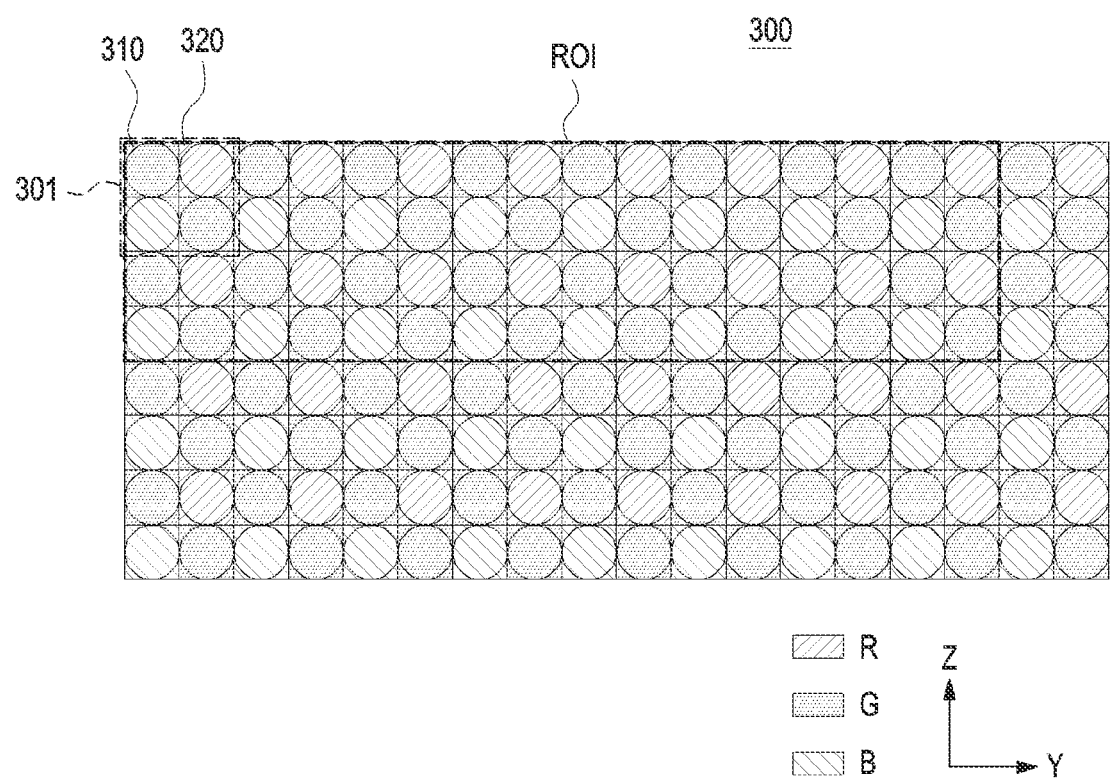
FIG. 3 illustrates an image sensor according to an embodiment.

FIG. 3 illustrates an image sensor according to an embodiment.

Referring to FIG. 3, an image sensor 300 (e.g., the image sensor 213 of FIG. 2) may include a plurality of pixels. Although FIG. 3 illustrates an example in which 18 pixels and 8 pixels are arranged in the y-axis direction (horizontal direction) and the z-axis direction (vertical direction, respectively, i.e., a total of 144 pixels, the disclosure is not limited thereto. For example, the image sensor 300 may include millions to tens of millions of pixels. The following description describes an example of an image sensor 300 that has a 4PD pixel structure and includes 12 million pixels as 4,000 sub-pixels and 3,000 sub-pixels in the y-axis direction (horizontal direction) are combined.

According to an embodiment, each of the plurality of pixels included in the image sensor 300 may be assigned one of a plurality of designated reference colors (e.g., red R, green G, or blue B). The plurality of pixels may be designed to receive light with a designated wavelength range in each light beam in a direction perpendicular to the y axis and the z axis. The plurality of pixels may output the electrical signal corresponding to the received light.

The image sensor 300 includes a plurality of micro-lenses 310 and a color filter array 320. Each unit pixel included in the image sensor 300 may include a micro-lens, a color filter, and a light receiving element (e.g., photodiode).

Figure 4:
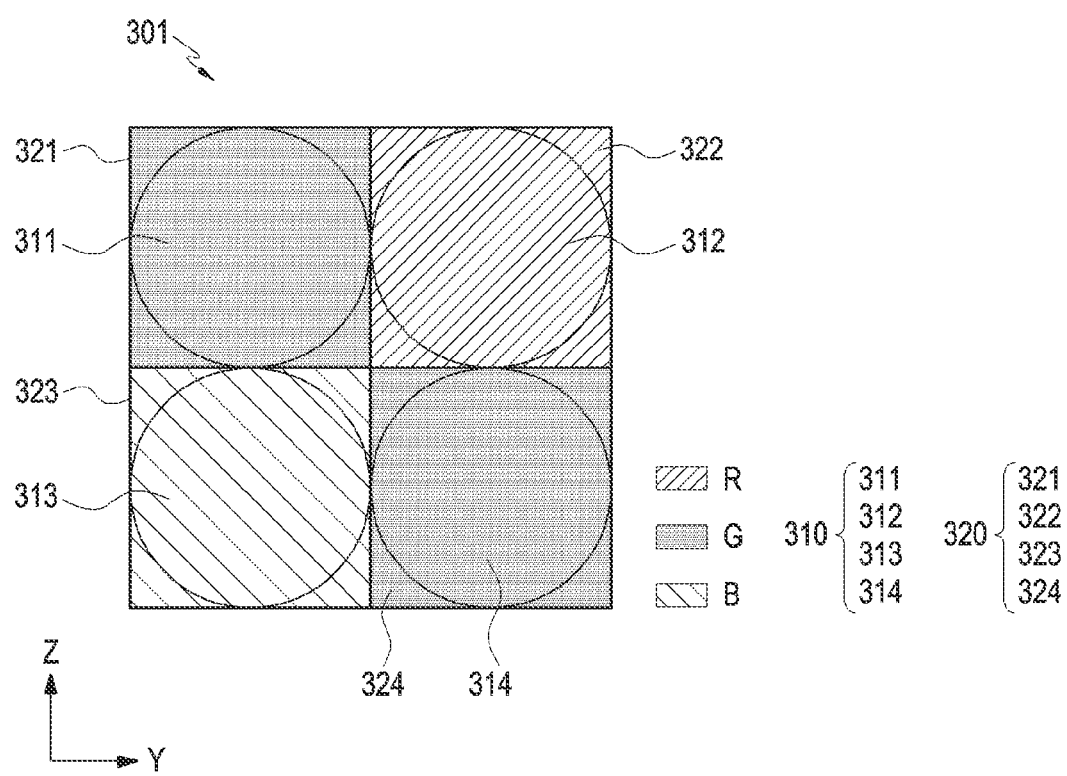
FIG. 4 illustrates a pixel group including a micro-lens and a color filter array according to an embodiment.

FIG. 4 illustrates a pixel group including a micro-lens and a color filter array according to an embodiment.

Referring to FIG. 4, the pixel group 301 included in the image sensor 300 may be composed of a combination of two or more unit pixels. One unit pixel may include a micro-lens, a color filter, and a light receiving element. The micro-lens may serve to refract and/or focus light. The color filter may be disposed behind the micro-lens with respect to the propagation path of the light and may transmit light having a designated reference color, i.e., light having a designated wavelength range. The light receiving element may be, e.g., a photodiode disposed behind the micro-lens and the color filter. When light reaches the light receiving element, an electrical signal corresponding to the incident light is output by photoelectric effect. The electrical signal may generate a charge (or current) according to an intensity (or amount) of the received light. FIG. 4 illustrates an embodiment in which four unit pixels are combined into one pixel group 301.

More specifically, one pixel group 301 may include a color filter array 320 in a 2×2 array. In the color filter array 320 according to the embodiment of FIG. 4, a first color filter 321 and a second color filter 322 included in a first row may be formed in [green G, red R], respectively, and a third color filter 323 and a fourth color filter 324 included in a second row may be formed in [blue B, green G], respectively. In other words, one pixel group 301 may include a color filter array 320 formed in a [green G, red R]×[blue B, green G] pattern. Further, the plurality of micro-lenses 310 included in the pixel group 301 may include first to fourth micro-lenses 311, 312, 313, and 314 respectively disposed corresponding to the first to fourth color filters 321, 322, 323, and 324. Further, the pixel group 301 may be repeatedly arranged, forming the image sensor 300 of FIG. 3. The repeated arrangement structure and pattern of the color filter array 320 may vary. As an example, FIG. 4 illustrates a pixel group 301 having a color filter array 320 formed in a Bayer pattern. However, without being limited thereto, the color filter array 320 may be formed in various patterns including RGBE, CYYM, CYGM, RGBW, and X-trans. For clarity, the following description focuses primarily on an RGB pattern (or RGGB pattern). However, it should be noted that other repeated arrangement structures and patterns of the color filter array 320 may be adopted without limitations. According to an embodiment, a plurality of pixel groups 301 as illustrated in FIG. 4 may be provided to form the image sensor 300.

One micro-lens and one color filter may be disposed in a unit pixel, and one light receiving element may be disposed behind the color filter. In other words, one light receiving element may be disposed in one unit pixel.

Alternatively, one micro-lens and one color filter may be disposed in a unit pixel, and two or more light receiving elements may be disposed behind the color filter.

Two light receiving elements may be disposed in a unit pixel, or four light receiving elements may be disposed in a unit pixel.

In general, when a plurality of light receiving elements are disposed in a unit pixel, elements having the same specifications are formed symmetrically (linear symmetry, or point symmetry) with respect to the center of the unit pixel. For example, when two light receiving elements are disposed in a unit pixel, they may be arranged in linear symmetry in left/right or upper/lower directions with respect to the center of the unit pixel, and when four light receiving elements are disposed in a unit pixel, they may be arranged in point symmetry in top right/top left/bottom right/bottom left directions with respect to the center of the unit pixel. Accordingly, when two light receiving elements are disposed in the unit pixel, the unit pixel structure may be denoted as a dual pixel structure (i.e., the 2PD pixel structure) and, when four light receiving elements are disposed in the unit pixel, the unit pixel structure may be denoted as a quad pixel structure, i.e., the 4PD pixel structure. The portion corresponding to each light receiving element included in the 2PD pixel structure and the 4PD pixel structure may be denoted as a sub-pixel.

Figure 5:
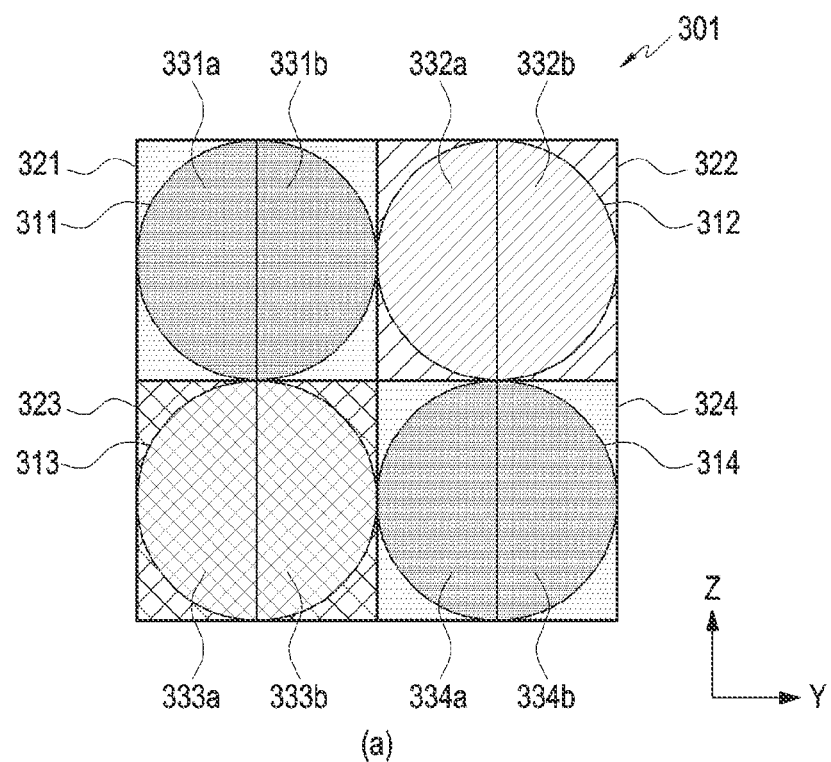
FIG. 5 illustrates a 2PD pixel and a 4PD pixel according to an embodiment.
Figure 5:
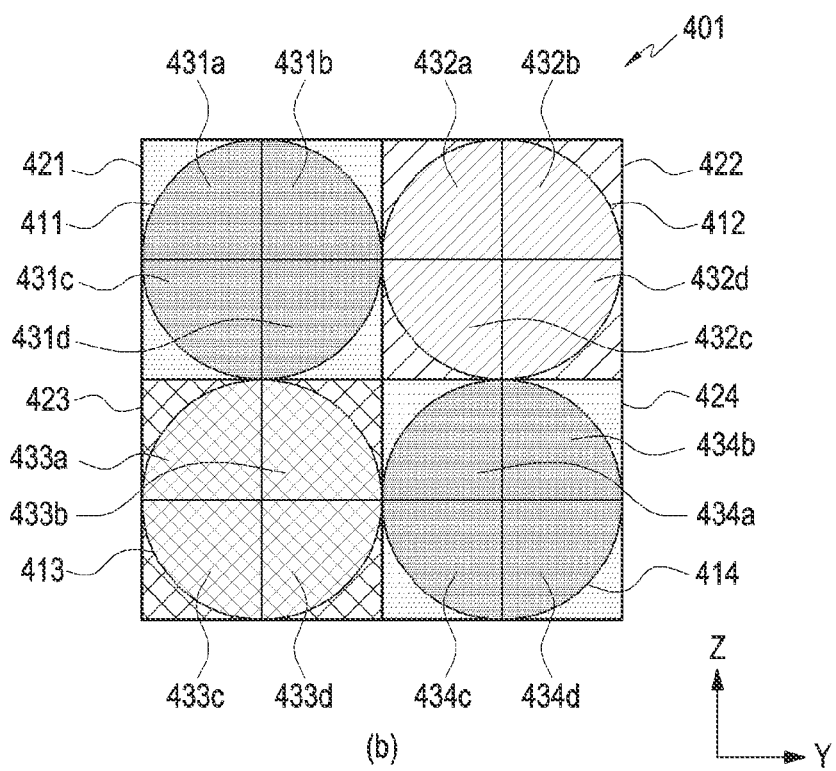

FIG. 5 illustrates a 2PD pixel structure and a 4PD pixel structure according to an embodiment. Specifically, structure (a) in FIG. 5 illustrates a 2PD pixel structure in which two light receiving elements are disposed in a unit pixel, and structure (b) in FIG. 5 illustrates a 4PD pixel structure in which four light receiving elements are disposed in a unit pixel.

The light receiving element included in each unit pixel may also be denoted as a photoelectric conversion element. Further, although the photodiode is described as an example of the light receiving element included in each unit pixel, each unit pixel may instead include pinned-photodiodes, phototransistors, or photogates.

Each of the plurality of light receiving elements included in each unit pixel may independently capture incident light into an image. While each of the plurality of light receiving elements captures the incident light into the image, the incident light may be output as a photoelectric conversion signal.

Referring to structure (a) in FIG. 5, each unit pixel may be divided into two portions in the Y direction (e.g., the Y direction of FIG. 4) as two different light receiving elements are disposed, and the photoelectric conversion signal of each light receiving element may be independently read. The pixel group 301 in structure (a) of FIG. 5 is described as an example. Two light receiving elements 331a and 331b may be provided in the unit pixel including the first micro-lens 311 and the first color filter 321, and two light receiving elements 332a and 332b may be provided in the unit pixel including the second micro-lens 312 and the second color filter 322. Two light receiving elements 333a and 333b may be provided in the unit pixel including the third micro-lens 313 and the third color filter 323, and two light receiving elements 334a and 334b may be provided in the unit pixel including the fourth micro-lens 314 and the fourth color filter 324.

Referring to structure (b) in FIG. 5, each unit pixel may be divided into four portions, i.e., two portions in the Y direction and two portions in the Z direction (e.g., the Z direction of FIG. 4) as four different light receiving elements are disposed, and the photoelectric conversion signal of each light receiving element may be independently read. The pixel group 401 in structure (b) of FIG. 5 is described as an example. Four light receiving elements 431a, 431b, 431c, and 431d may be provided in the unit pixel including the first micro-lens 411 and the first color filter 421, and four light receiving elements 432a, 432b, 432c, and 432d are provided in the unit pixel including the second micro-lens 412 and the second color filter 422. Four light receiving elements 433a, 433b, 433c, and 433d are provided in the unit pixel including the third micro-lens 413 and the third color filter 423, and four light receiving elements 434a, 434b, 434c, and 434d are provided in the unit pixel including the fourth micro-lens 414 and the fourth color filter 424. In other words, in the embodiment illustrated in structure (b) of FIG. 5, each of the plurality of image pixels is a 4PD pixel which includes four light receiving elements in each micro-lens and may include a first sub-pixel, a second sub-pixel, a third sub-pixel, and a fourth sub-pixel.

Figure 6:
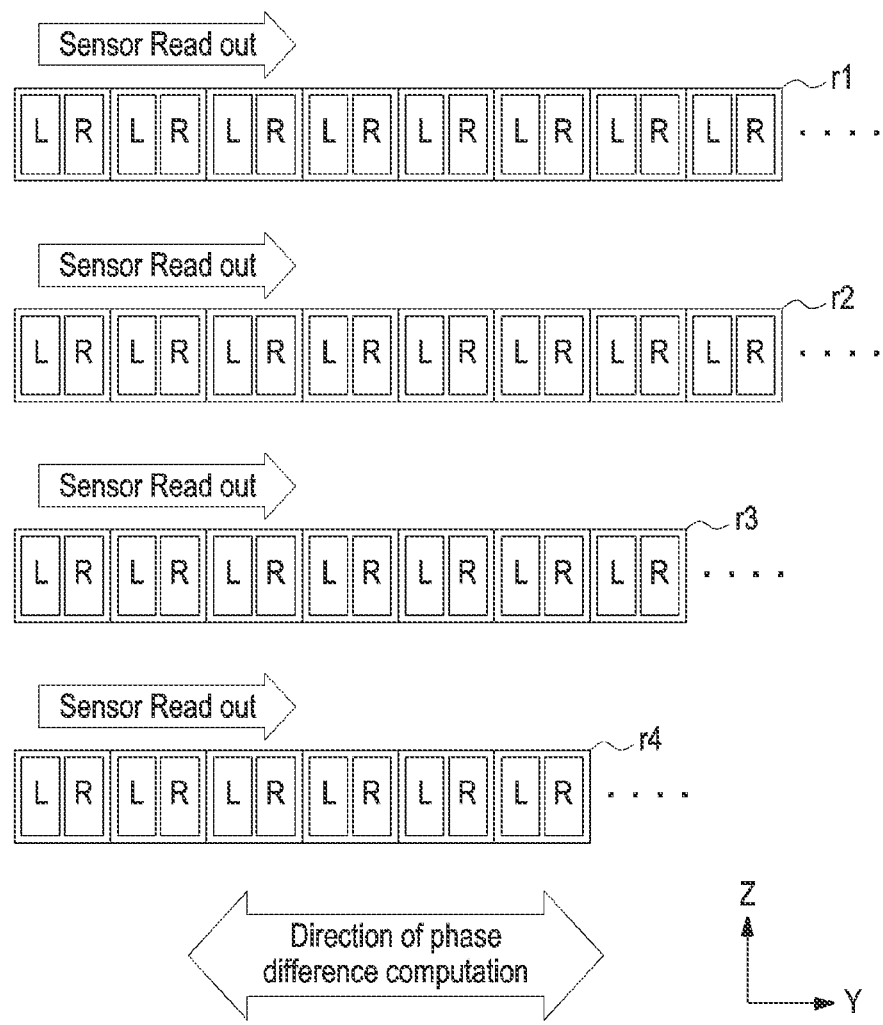
FIG. 6 illustrates a method for reading photoelectric conversion signals of a plurality of light receiving elements according to an embodiment.

FIG. 6 illustrates a method for reading photoelectric conversion signals of a plurality of light receiving elements according to an embodiment.

For clarity, FIG. 6 illustrates a method for reading a photoelectric conversion signal for a 2PD pixel in which two light receiving elements are disposed in the unit pixel according to structure (a) in FIG. 5.

The photoelectric conversion signal of the two light receiving elements disposed in the unit pixel may represent a phase difference between the light beams arriving at different incident angles on the individual light receiving elements. Accordingly, the photoelectric conversion signal of the two light receiving elements may be divided into a left component and right component of the incident light. The phase difference of the incident light may be detected by comparing the left component and the right component. The photoelectric conversion signal of each light receiving element may include an output value containing various color information (e.g., red R, green G, or blue B) of the unit pixel of the color filter. The photoelectric conversion signal of each light receiving element may be stored in the form of raw data. According to another embodiment, the photoelectric conversion signal of each light receiving element may also be stored after undergoing such processing as interpolation of the color values of the neighboring pixels adjacent to the output value of the red R, green G, or blue B included in the unit pixel of the color filter. Referring to FIG. 6, in the photoelectric conversion signal of the 2PD pixel, the left component and the right component may be denoted by 'L' and 'R,' respectively.

Figure 7:
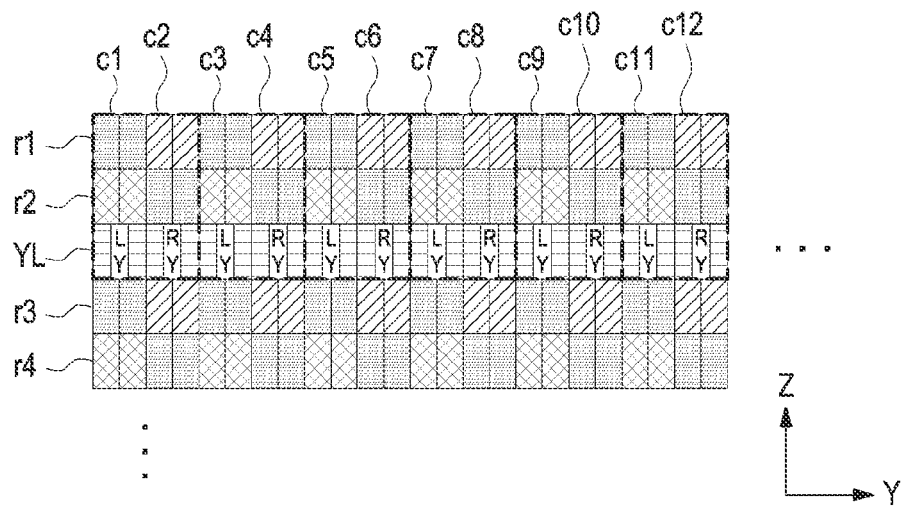
FIG. 7 illustrates a plurality of image pixels according to an embodiment.

FIG. 7 illustrates a plurality of image pixels according to an embodiment.

FIG. 7 illustrates a plurality of image pixels arranged in a Bayer pattern. The plurality of image pixels of FIG. 7 may be ones in which the pixel group 301 shown in FIG. 4 being repeatedly disposed, and two photodiodes are disposed in each micro-lens included in the pixel group 301. For example, FIG. 7 shows a plurality of image pixels composed of first to fourth rows r1, r2, r3, and r4 and first to twelfth columns c1, c2, c3, c4, c5, c6, c7, c8, c9, c10, c11, and c12, in which there are prepared a plurality of same 2×2 pixel groups each composed of a combination of the first row r1, the second row r2, the first column c1, and the second column c2 and repeatedly arranged in a first direction (e.g., the z direction) and a second direction (e.g., the y direction).

The photoelectric conversion signal of each light receiving element may further include phase difference information about each pixel, and the phase difference data containing the phase difference information may be output in the form of YCbCr data to represent a color space. As another example, the phase difference data may be output in a state of containing only luminance Y information except for the color information of Cb/Cr of the data form of YCbCr for representing a color space so as to reduce the amount (or size) of data stored. In sum, the photoelectric conversion signal of each light receiving element for the left component and right component of the incident light may be represented as data (LY, RY) for luminance Y and may include phase difference information.

The ISP (e.g., the image signal processor 232 of FIG. 2) performs a correlation calculation on the data of the light receiving element, represented as the phase difference data (e.g., luminance (Y) data) value, thereby detecting the phase difference. In this case, the correlation calculation may be performed on the plurality of image pixels. For example, the correlation calculation may be carried out on the plurality of image pixels in a predetermined range of the same pixel row or column. According to the embodiment shown in FIG. 6, the correlation calculation may be executed by reading out the data for the plurality of image pixels in the second direction (e.g., horizontal direction (y direction)). The ISP 232 may read out the plurality of image pixels, disposed in the first row r1, second row r2, third row r3, and fourth row r4, in the second direction (e.g., horizontal direction (y direction)) and perform correlation calculation. The ISP 232 may read out the data of the plurality of image pixels arranged in the first row r1 and then sequentially perform read-out on the second row r2, third row r3, and fourth row r4. After reading out on the first row r1, second row r2, third row r3, and fourth row r4, the phase difference information about each pixel may be output, in the form of phase difference data (e.g., luminance data) including phase difference information, using a line memory included in the image sensor 213 and/or the image processing part 230.

The area denoted by the dashed lines in FIG. 7 is a focus detection area shown to the user, i.e., a region of interest (ROI). For example, as a ROI, 12 pixels may be set which are arranged in the same row. However, without limited thereto, an ROI may be set targeting various numbers of pixels, e.g., 6, 8, 16, or 24 pixels, arranged in the same row. Further, an ROI may be set by bundling pixels arranged in two different rows (e.g., r1 and r2) so as to increase data output and hence reliability for data. As another example, as shown in FIG. 7, 6 2×2 pixel groups arranged in the second direction (e.g., y direction) may be set as an ROI. However, without limited thereto, a ROI may be set in the first direction (e.g., the z direction). As described above, each pixel in the set ROI may include two photodiode, so that each of the plurality of pixels in the pixel group may output a photoelectric conversion signal which is divided into the left component and right component of the incident light.

The photoelectric conversion signal may include pixel data including color information and phase difference data including phase difference information. As another example, the phase difference data may be output in a form that only includes luminance data to reduce the amount of data stored. For example, as shown in FIG. 7, only the left components of the photoelectric conversion signals in one pixel group may be gathered and output as 'LY' data, and only the right components of the photoelectric conversion signals in one pixel group may be gathered and output as 'RY' data. The 'LY' data and the 'RY' data may be gathered and output to one line YL. Correlation calculation for phase difference detection may be performed using the output LY data and RY data. Meanwhile, in the embodiment shown in FIG. 7, LY data and RY data are output with two rows (e.g., r1 and r2) for ease of description. However, without limited thereto, LY data and RY data may be output with four rows (e.g., r1, r2, r3, and r4) or more rows.

Figure 8:
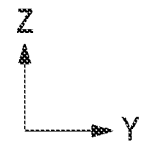
FIG. 8 illustrates a method for correlation of data for calculating phase difference detection according to an embodiment.

FIG. 8 illustrates a method for correlation of data for calculating phase difference detection according to an embodiment.

The total sum of the absolute values of the differences between 'LY' data and 'RY' data shown in FIG. 7 may be defined as a correlation calculation value. State (a) in FIG. 8 shows a state in which the position of the pixel is not shifted for correlation calculation, and state (b) in FIG. 8 shows a state in which the position of the pixel is shifted for correlation calculation. State (c) in FIG. 8 shows the correlation calculation value detected through shifting the position of the pixel. The shifting may be performed on each pixel or on each pixel group. Referring to FIGS. 7 and 8, correlation calculation may be performed in a way of obtaining the correlation calculation value between 'LY' data and 'RY' data while shifting the position of the target pixel for correlation calculation in one direction (e.g., the Y direction) or unilaterally (e.g., the Y direction or −Y direction). The correlation calculation may adopt, as a specific example, census or such methods for discovering, e.g., the sum of squared difference (SSD), mean of absolute difference (MAD) or sum of absolute difference (SAD), or other various schemes.

A result of the correlation calculation may be used for focus adjustment, depth information detection, and the like. A minimum value among correlation calculation values may be defined as a focal position. For example, the correlation calculation value according to the difference between 'LY' data and 'RY' data may be obtained as shown in state (c) in FIG. 8 while shifting the pixel in one direction as shown in state (a) in FIG. 8 and state (b) in FIG. 8, and disparity information about the object corresponding to the ROI may be obtained thereby.

Meanwhile, the description of the embodiment of FIG. 8 relates to reading the photoelectric conversion signal for the 2PD pixel including two light receiving elements in the unit pixel as in structure (a) in in FIG. 5, for example. Meanwhile, as in structure (b) in FIG. 5, the photoelectric conversion signal for the 4PD pixel including four light receiving elements in the unit pixel requires detection of the top-to-bottom phase difference, as well as the left-to-right phase difference, unlike in structure (a) in FIG. 5 in which only left-to-right phase difference detection of the photoelectric conversion signal is needed.

Hereinafter, a method for top-to-bottom phase difference detection according to an embodiment is described.

Figure 9:
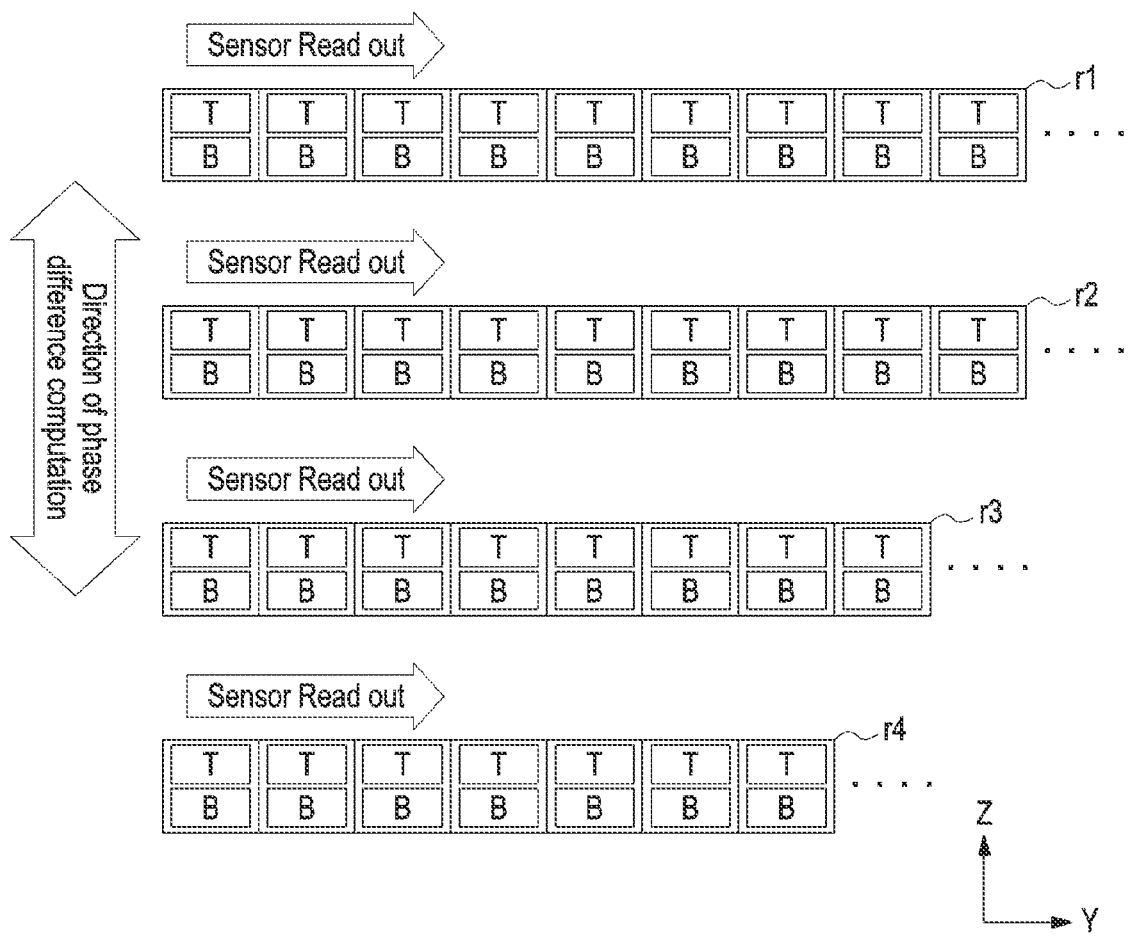
FIG. 9 illustrates a method for reading photoelectric conversion signals of a plurality of light receiving elements according to an embodiment.

FIG. 9 illustrates a method for reading photoelectric conversion signals of a plurality of light receiving elements according to an embodiment.

FIG. 9 illustrates a method for reading a photoelectric conversion signal for a case where two light receiving elements are arranged top-to-bottom or a 4PD pixel including four light receiving elements in the unit pixel. Here, the 4PD pixel including four light receiving elements may be, e.g., a 4PD pixel in which one light receiving element is disposed at each of the top right, top left, bottom right, and bottom left. The embodiment shown in FIGS. 6 to 8 may be applied to the method for left-to-right phase difference detection for the 4PD pixel structure. In contrast, the description focuses mainly on the structure (b) in FIG. 5 in relation to the method for top-to-bottom phase difference detection of the 4PD pixel structure.

The photoelectric conversion signal of the light receiving elements separately disposed from the top to bottom in the unit pixel may represent a phase difference between the light beams incident, at different incident angles, on the individual light receiving elements. For example, the photoelectric conversion signal of the light receiving elements may be divided into a top component and bottom component of the incident light. The phase difference of the incident light may be detected by comparing the top component and the bottom component. For convenience of description, the phase difference detection for the left and right components described in connection with FIGS. 6 to 8 may be defined as 'horizontal phase difference detection,' and the phase difference detection for the top and bottom components described below in connection with FIGS. 9 and 10 may be defined as 'vertical phase difference detection.'

Similar to the horizontal phase difference detection method mentioned in FIG. 6, in the vertical phase difference detection method, the photoelectric conversion signal of each light receiving element may be converted into data for the luminance (Y) value of YcbCr for representing a color space and be used. For example, the photoelectric conversion signal of each light receiving element for the top component and the bottom component of the incident light may be represented as data for luminance Y. Referring to FIG. 9, in the photoelectric conversion signal of the image pixel, the top component and the bottom component may be denoted by 'T' and 'B,' respectively.

In the vertical phase difference detection method, the ISP (e.g., the image signal processor 232 of FIG. 2) may also perform correlation calculation on the data of the light receiving element, represented as the luminance (Y) value, thereby detecting the phase difference. In this case, the correlation calculation may be performed on the plurality of image pixels. Similar to the horizontal phase difference detection method performed on the plurality of image pixels arranged in the same pixel row, vertical phase difference detection may be carried out on the plurality of image pixels arranged in the same column.

However, unlike in the horizontal phase difference detection in which the direction of reading out the data of the plurality of image pixels is the same as the array of the pixels which are targets for phase difference detection, in the vertical phase difference detection, the direction of reading out the data of the plurality of image pixels may differ from the array of the pixels which are targets for phase difference detection. For example, in relation to the direction of reading out the data of the plurality of image pixels (e.g., the second direction (y direction)), the plurality of image pixels which are targets for phase difference detection may be arranged in the second direction which is parallel to the read-out direction in FIG. 6 whereas, in FIG. 9, the plurality of image pixels, as targets for phase difference detection, may be arranged in the first direction (e.g., z direction) perpendicular to the read-out direction (e.g., the second direction).

Figure 10:
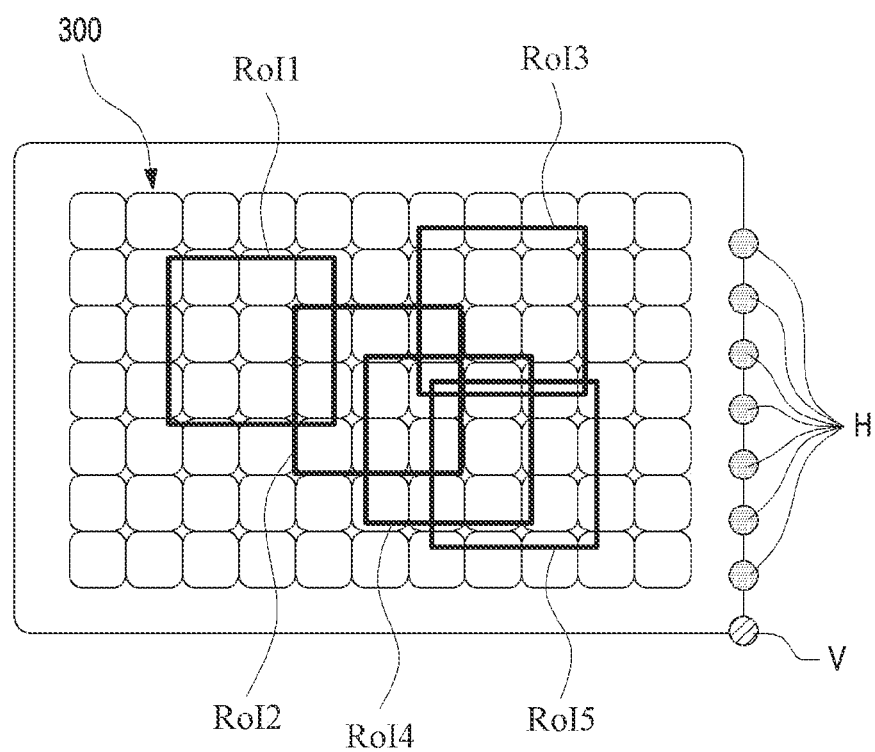
FIG. 10 illustrates distance measurement points for phase difference detection in a horizontal direction and phase difference detection in a vertical direction in an image sensor including a plurality of image pixels according to an embodiment.

FIG. 10 illustrates distance measurement points for phase difference detection in a horizontal direction and phase difference detection in a vertical direction in an image sensor including a plurality of image pixels according to an embodiment.

Referring to FIG. 10, an ROI may be set for an image sensor including a plurality of image pixels. The plurality of image pixels included in the image sensor each may be formed of a 4PD pixel including four photodiodes and, to focus thereon, a horizontal phase difference detection operation and a vertical phase difference detection operation may be performed. According to an embodiment, the ROI may be arbitrarily set in various positions of the image sensor, and a horizontal phase difference detection operation and a vertical phase difference detection operation may be performed on ROIs (e.g., ROI1, ROI2, ROI3, ROI4, and ROI5) set in various positions.

In performing the horizontal phase difference detection operation and vertical phase difference detection operation on the ROI, it may be required to set a horizontal distance measurement point H for detecting the left component and right component of the photoelectric conversion signal and a vertical distance measurement point V for detecting the top component and bottom component. Here, the distance measurement point may be a point that distinguishes between different rows of a plurality of image pixels provided in the image sensor 213 to specify an area for calculating a phase difference. At the horizontal distance measurement point H, line memory that is present for each of the multiple rows may be stored and, at the vertical distance measurement point V, a frame memory including all of the plurality of rows may be stored. Here, the 'line memory' may be related to information present every multiple rows, and the 'frame memory' may be related to information about the entire frame including at least two or more rows. For example, while the line memory may be stored every multiple horizontal distance measurement points H, the frame memory may include information about the plurality of horizontal distance measurement points H and be stored in whole.

In general, the photoelectric conversion signal of each pixel needs to be read out to perform phase difference detection. In this case, the direction of read-out may be fixed to one direction. Accordingly, the horizontal phase difference detection operation may be performed using the line memory, and the vertical phase difference detection operation may be performed using the frame memory. In other words, the vertical phase difference detection operation may cause delay due to the need for using the frame memory in computation. In the horizontal phase difference detection operation, correlation calculation may be performed immediately after the read-out on the row is finished. In the vertical phase difference detection operation, correlation calculation may not be performed immediately after read-out is finished because the frame memory is applied. Thus, it may be difficult to synchronize the horizontal phase difference detection operation and the vertical phase difference detection operation. As described above, if a frame delay occurs in the phase difference detection operation, it may be hard to perform auto-focus driving which requires quick computation.

Figure 11:
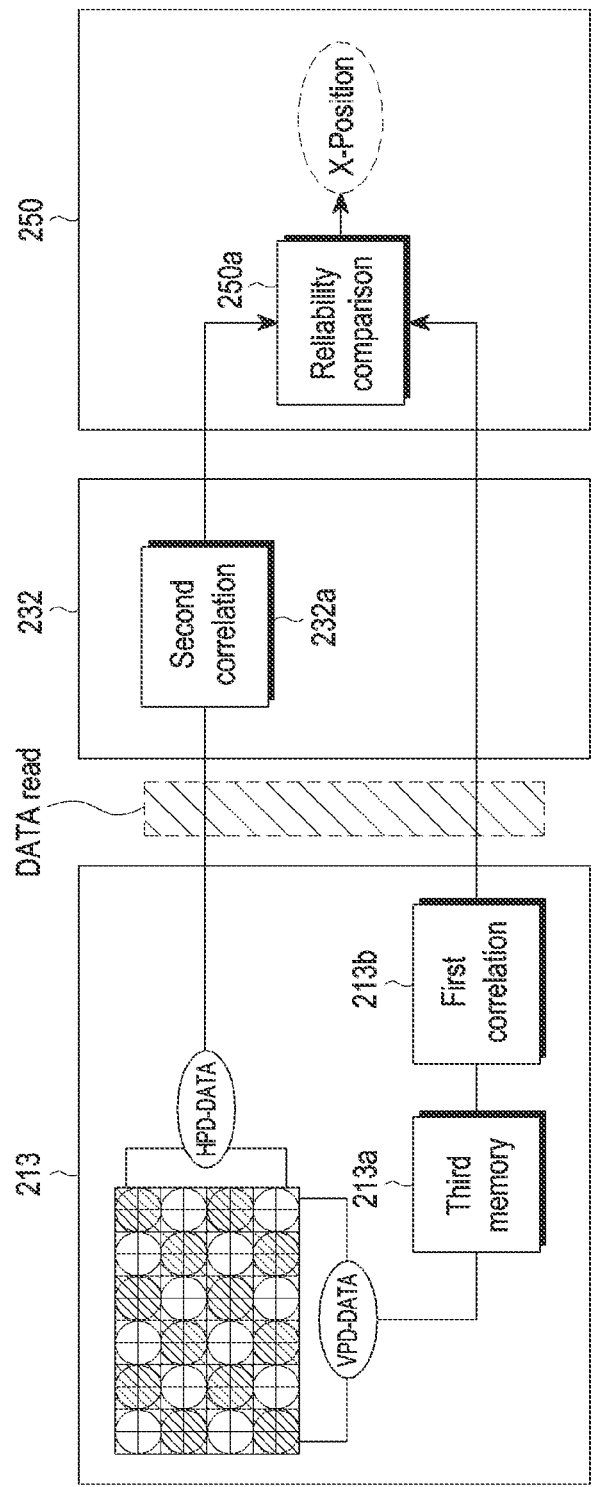
FIG. 11 illustrates components of an electronic device for phase difference detection in vertical and horizontal directions according to an embodiment.

FIG. 11 illustrates components of an electronic device for phase difference detection in vertical and horizontal directions according to an embodiment.

According to an embodiment of the disclosure, to output the vertical phase difference detection operation and the horizontal phase difference detection operation at similar times, image sensor 213 may perform correlation calculation before at least one processor, e.g., ISP 232 or processor 260, performs computation.

According to an embodiment of the disclosure, the electronic device may include the image sensor 213 that includes a plurality of image pixels arranged in the first direction and the second direction perpendicular to the first direction, may convert the light incident on a plurality of micro-lenses into an electrical signal, perform a first correlation calculation for phase difference detection for the first direction based on the electrical signal, and outputs image data including the first phase difference correlation calculation value. Here, the first direction may be, e.g., a vertical direction (e.g., the z direction of FIG. 9), and the second direction may mean a horizontal direction (e.g., the y direction of FIG. 9). Hereinafter, the vertical phase difference detection operation may be referred to as a phase difference detection operation in the first direction, and the horizontal phase difference detection operation may be referred to as a phase difference detection operation in the second direction. The phase difference detection operation in the first direction and the phase difference detection operation in the second direction may include, e.g., correlation calculation as described above in connection with FIG. 8. The respective results of the phase difference detection operation in the first direction and the phase difference detection operation in the second direction may be referred to as a first phase difference correlation calculation value and a second phase difference correlation calculation value, respectively.

According to an embodiment of the disclosure, it is possible to prevent a frame delay, which may arise as the processing of obtaining phase difference data in the direction perpendicular to the read-out direction is performed after the read-out of one frame is finished, by computing the first phase difference correlation calculation value by the image sensor 213.

Basically, the ISP 232 may perform various computational operations, including a correlation calculation, using image data. The ISP 232 may perform a second correlation calculation 232a in the second direction (e.g., the horizontal direction) as part of phase difference detection, among of various computational operations. The second correlation calculation 232a may be performed through pixel shifting (refer to FIG. 8) in the second direction using as many line memories as the number of pixel data bits in the second direction. For example, when the image sensor 213 is provided in a unit of 4000 (H)×3000 (V) (pixel by pixel), line memories as 4000 pixels may be stored (e.g., stored in the first memory 240 of FIG. 2). If binning is performed on the image sensor 213, the amount of data stored in the memory (e.g., the first memory 240 of FIG. 2) may be reduced. For example, if 4 binning is performed in the second direction of 4000(H)×3000(v), as much as 1000 pixels of data may be stored. However, when the unit pixel is a 4 PD pixel, data is stored in each light receiving element (e.g., the top left 431a, 432a, 433a, and 434a, top right 431b, 432b, 433b, and 434b, bottom left 431c, 432c, 433c, and 434c, and bottom right 431d, 432d, 433d, and 434d in structure (b) in FIG. 5). Thus, despite 4 binning, the data quantity of 4000 pixels may be required.

According to an embodiment of the disclosure, the electronic device may perform a first correlation calculation 213b as part of the phase difference detection operation in the first direction (e.g., the vertical direction). For the first correlation calculation 213b, shifting-type phase difference calculation may be performed in the first direction using as many line memories (e.g., the third memory 213a (or line memory)) as the number of pixel data bits in the first direction. Similar to shifting each unit pixel in the second direction as shown in FIG. 8, the shifting-type phase difference computation in the first direction may be performed while shifting each pixel in the first direction. According to an embodiment of the disclosure, as the read-out direction for the image pixels is perpendicular to the direction of phase difference computation, the phase difference detection operation in the first direction may be implemented after a sampling read-out operation is performed on at least some rows. For example, the phase difference detection operation in the first direction may be performed after the entire area of the plurality of image pixels or a plurality of rows in the first direction in the ROI are sampled and read out. In this case, data by sampling the readout operation on at least some rows may be stored in the third memory 213a, with the third memory 213a differing from the first memory (e.g., 240 of FIG. 2) and the second memory (e.g., 280 of FIG. 2) storing information or commands for relevant operations after the read-out on the image pixels and, may be integrated into the image sensor 213, in the form of a chip. For example, when the image sensor 213 is provided in a 4000 (H)×3000 (V) pixel by pixel unit, the third memory 213a may include at least two or more rows of 4000 pixel line memories in the second direction. For example, even in this case, binning may be performed, and it may be required to store as much data as 4PD pixels are applied. According to an embodiment, before the first correlation calculation 213b according to the phase difference detection operation in the first direction, IIR- or FIR-type shading, gamma, defect pixel correction (DPC) or such correction may further be performed, and data for such correction may also be stored in the third memory 213a.

Referring to the embodiment shown in FIG. 11, the first correlation calculation 213b may be performed before the second correlation calculation 232a. The first correlation calculation 213b may be performed by the image sensor 213, and the first correlation calculation 213b may be performed substantially simultaneously with the read-out on the image pixels.

Figure 12:
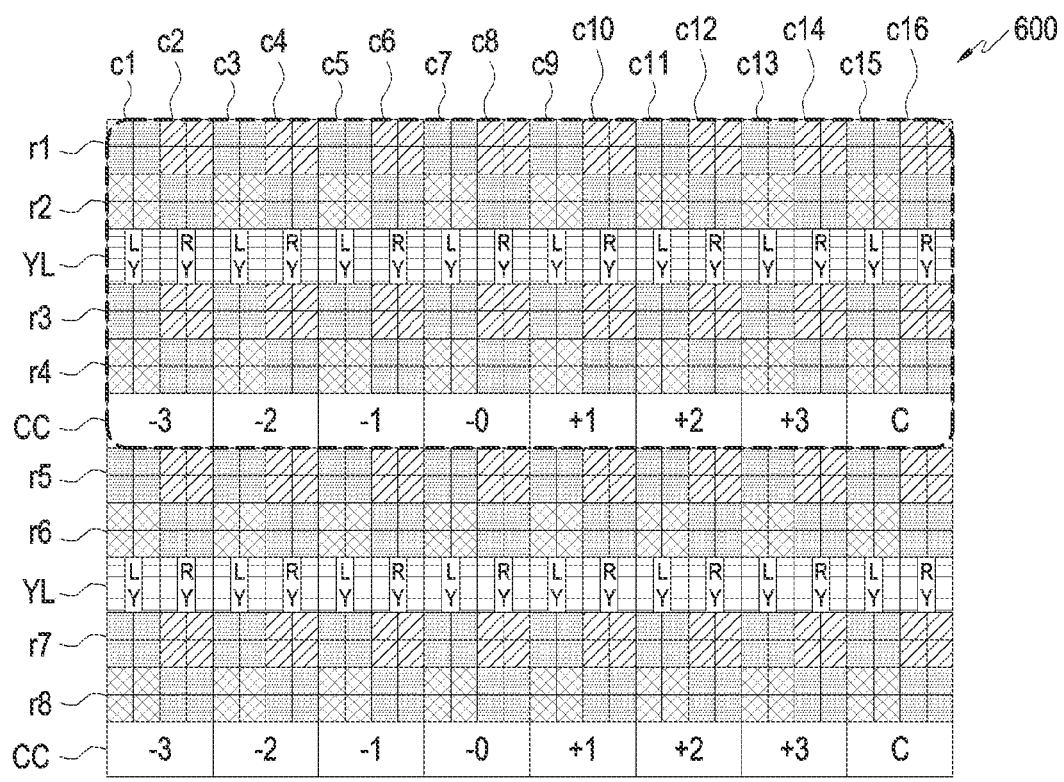
FIG. 12 illustrates data immediately after a first correlation calculation according to an embodiment.

FIG. 12 illustrates data immediately after a first correlation calculation according to an embodiment.

FIG. 12 illustrates a plurality of image pixels arranged in a Bayer pattern. Here, the embodiment shown in FIG. 12 may represent information about the image pixel read between the image sensor 213 shown in FIG. 11 and the ISP 232. The image data may include information about the image pixel read between the image sensor 213 and the ISP 232. That is, the image data may include the first phase difference correlation calculation value and phase difference data.

The plurality of image pixels of FIG. 12 may be ones in which the pixel group 301 shown in FIG. 4 is repeatedly disposed, and four photodiodes are disposed in each microlens included in the pixel group 301. For example, FIG. 12 shows a plurality of image pixels composed of first to eighth rows r1, r2, r3, r4, r5, r6, r7, and r8, and first to twelfth columns c1, c2, c3, c4, c5, c6, c7, c8, c9, c10, c11, and c12. The plurality of image pixels may be formed as a plurality of same 2×2 pixel groups each including a combination of the first row r1, the second row r2, the first column c1, and the second column c2 are prepared and repeatedly arranged in the first direction (e.g., the y direction) and the second direction (e.g., the z direction).

The area denoted by the dashed lines in FIG. 12 is a focus detection area shown to the user, i.e., an ROI minimum unit. For example, a ROI in which 16 unit pixels are arranged in the same row may be set, but is not limited thereto. Further, a ROI may be set by bundling unit pixels arranged in two or more different rows (e.g., r1 and r2) so as to increase data output and hence reliability for data. As another example, as shown in FIG. 12, 16 2×2 pixel groups arranged in the first direction (e.g., y direction) may be set as a ROI. As described above, each unit pixel in the set ROI may include four photodiodes, so that each of the plurality of pixels in the pixel group may output a photoelectric conversion signal which is divided into the left component and right component of the incident light and the top component and bottom component of the incident light.

The image data shown in FIG. 12 may include raw data for the plurality of image pixels. Here, the raw data may be the photoelectric conversion signal of the light receiving element, which is stored in the form of a file without being processed by the image processing part (e.g., 230 of FIG. 2). The raw data for the image pixels may be in a lossless-compressed form or a form stored with a log applied thereto, or the photoelectric conversion signal of the light receiving element may be stored in the form of data for the luminance (Y) value of YCbCr for representing a color space. The image data may include 'LY' data resulting from gathering and outputting only the left components of the photoelectric conversion signals in one pixel group and 'RY' data resultant from gathering and outputting only the right components of the photoelectric conversion signals in one pixel group. As shown in FIG. 12, the 'LY' data and the 'RY' data may be collected and stored and output in the form of one line memory YL. According to another embodiment, as the image data, only the top components of the photoelectric conversion signals in one pixel group and only the bottom components of the photoelectric conversion signals in one pixel group may be collected and be objected to first correlation calculation. Referring to the embodiment shown in FIG. 12, the first correlation calculation may be performed immediately without outputting raw data for the top components and the bottom components of the photoelectric conversion signals, unlike the second correlation calculation.

The image data output from the image sensor 213 may include luminance data for the second direction and the first phase difference correlation calculation value for the first direction at equal intervals between the raw data for the plurality of image pixels. For example, as shown in FIG. 12, the image data output from the image sensor may include raw data for the plurality of image pixels composed of the first to fourth rows r1, r2, r3, and r4 and the first to twelfth columns c1, c2, c3, c4, c5, c6, c7, c8, c9, c10, c11, and c12, the first phase difference correlation calculation value for the first direction, and the luminance data for the second direction. Further, as shown in FIG. 12, the image data output from the image sensor may include raw data for the plurality of image pixels composed of the fifth to eighth rows r5, r6, r7, and r8 and the first to twelfth columns c1, c2, c3, c4, c5, c6, c7, c8, c9, c10, c11, and c12, the first phase difference correlation calculation value for the first direction, and the luminance data for the second direction. It is possible to prevent deterioration of image quality due to differences in exposure in image line units by outputting the luminance data for the second direction and the first phase difference correlation calculation value for the first direction at equal intervals.

Figure 13:
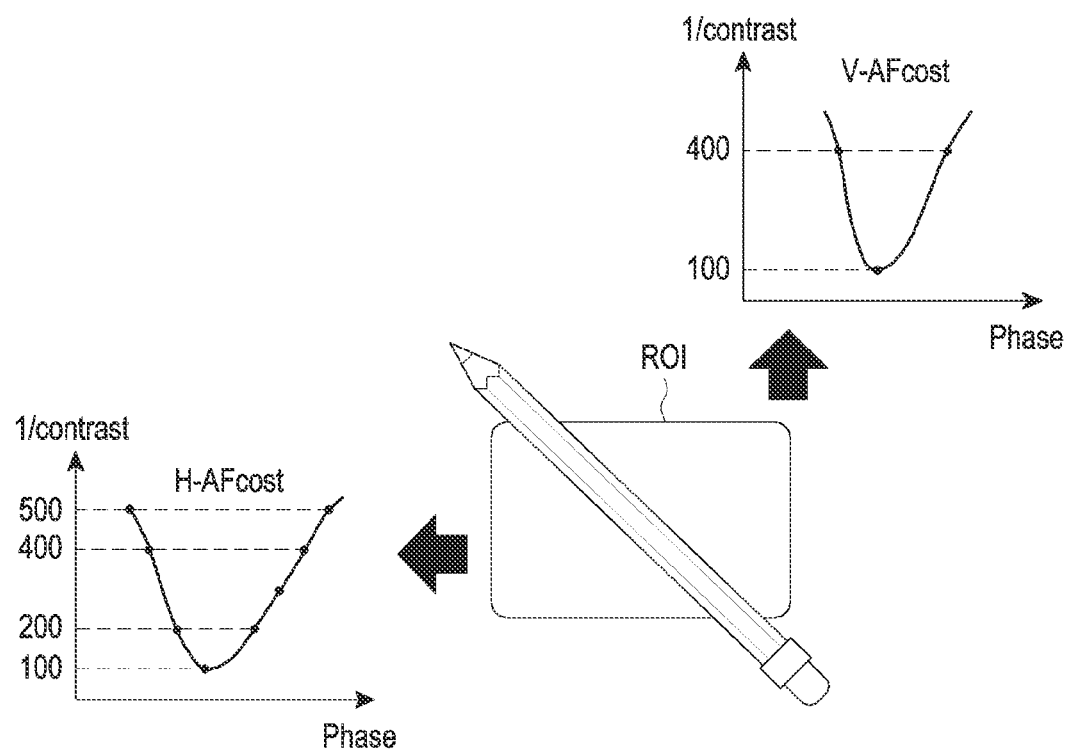
FIG. 13 illustrates a method for producing reliability information according to a phase difference detection operation in a first direction and phase difference detection operation in a second direction according to an embodiment.

FIG. 13 illustrates a method for producing reliability information according to a phase difference detection operation in a first direction and phase difference detection operation in a second direction according to an embodiment.

Referring to FIG. 13, in relation to a method for focusing on an object (e.g., a pencil) within an ROI, the processor 260 may perform a first-direction phase difference detection operation and a second-direction phase difference detection operation. In this case, the processor 260 may increase the computation speed by performing the phase difference detection operation in the first direction, i.e., the first correlation calculation 213b, before the phase difference detection operation in the second direction, i.e., the second correlation calculation 232a, as described above. The processor 260 may produce reliability information using the result of the correlation calculation. The processor 260 may yield the reliability for correlation calculation curves in different directions through differences between the lowest points of the correlation calculation curves and adjacent specific points. In this case, the specific points adjacent to the lowest points may be set as points spaced apart by the same distance from the phase axis values of the lowest points.

For example, since the difference (200−100=100) between the lowest point of the correlation calculation curve in the second direction and an adjacent specific point as shown on the left side of FIG. 13 is larger than the difference (400−100=300) between the lowest point of the correlation calculation curve in the first direction and an adjacent specific point as shown on the upper side of FIG. 13, the processor 260 may determine that the correlation calculation curve 820 in the first direction has high reliability.

The electronic device (e.g., the electronic device 200 of FIG. 2) adjusts the focus of at least one camera module based on the first phase difference correlation calculation value for the first direction and the second phase difference correlation calculation value for the second direction using a driver 250 (e.g., the driver 215 or 216 of FIG. 2). The driver 250 may set an optimal position for adjusting the focus of the camera module by applying a weight determined through comparison in reliability (e.g., reliability comparison 250a of FIG. 11) between the first phase difference correlation calculation value and the second phase difference correlation calculation value. For example, referring to the embodiments of FIGS. 11 and 13 together, since the first phase difference correlation calculation value has higher reliability, an optimal position for adjusting the focus of the camera module may be set (X-position) by applying a weight to the data for the first phase difference correlation calculation value.

An electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements.

It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to an embodiment, an electronic device including at least one camera module (e.g., the camera module 180 of FIG. 1) may comprise an image sensor (e.g., the image sensor 213 of FIG. 2) including a plurality of image pixels arranged in a first direction (e.g., the Z-axis direction of FIG. 3) and a second direction (e.g., the Y-axis direction of FIG. 3) orthogonal to the first direction, converting light incident on a plurality of micro-lenses into an electrical signal, performing a first correlation calculation for phase difference detection in the first direction based on the electrical signal, and outputting image data including a first phase difference correlation calculation value; an ISP (e.g., the image signal processor 232 of FIG. 2) configured to perform a second correlation calculation for phase difference detection in the second direction using phase difference information about the image data; and a driver configured to adjust a focus of the at least one camera module based on the first phase difference correlation calculation value for the first direction and the second phase difference correlation calculation value for the second direction.

The first direction may be perpendicular to a read-out direction for the plurality of image pixels, and the second direction may be identical to the read-out direction of the plurality of image pixels.

Each image pixel of the plurality of image pixels comprises a pixel structure provided with four photodiodes as light receiving elements (4PD pixel) including one micro-lens, with a first sub-pixel, a second sub-pixel, a third sub-pixel, and a fourth sub-pixel.

The first correlation calculation may be performed through phase comparison according to a shift between adjacent pixels in the first direction for a first sub group of the first sub-pixel and the second sub-pixel and a second sub group of the third sub-pixel and the fourth sub-pixel.

The ISP is further configured to perform a re-mosaic function to re-align data output from the ISP, via the 4PD pixel included in the plurality of image pixels.

The first correlation calculation may be performed using a predetermined number of sampled line memories in the first direction.

Image data output from the image sensor may include pixel data including color information about the plurality of image pixels, the first phase difference correlation calculation value for the first direction, and phase difference data including phase difference information for the second direction.

The image data output from the image sensor may include the first phase difference correlation calculation value for the first direction and the phase difference data including the phase difference information for the second direction at equal intervals between pixel data for the plurality of image pixels.

The second correlation calculation may be performed by phase comparison according to a shift in the second direction for a third sub group of the first sub-pixel and the third sub-pixel and a fourth sub group of the second sub-pixel and the fourth sub-pixel, between adjacent pixels.

The driver may be configured to adjust the focus of the at least one camera module by applying a weight through reliability comparison on each of the first phase difference correlation calculation value and the second phase difference correlation calculation value.

The first correlation calculation may be performed on a portion, corresponding to an ROI, or an entire area of the plurality of image pixels.

According to an embodiment, a method for controlling an electronic device including a camera, an image sensor and at least one processor is provided that includes performing, using the image sensor, a first correlation calculation for phase difference detection in a first direction on a plurality of image pixels included in an image sensor, the image sensor being configured to collect light incident to the lens, and the plurality of pixels being arranged in the first direction and a second direction orthogonal to the first direction; performing, using at least one processor, a second correlation calculation for phase difference detection in the second direction, and adjusting a focus of the camera based on a first phase difference correlation calculation value for the first direction and a second phase difference correlation calculation value for the second direction.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device, comprising:
   a camera;
   an image sensor including a plurality of image pixels arranged in a first direction and a second direction orthogonal to the first direction, and configured to convert light incident on a plurality of micro-lenses into an electrical signal, perform a first correlation calculation for phase difference detection in the first direction based on the electrical signal, and output image data including phase difference information and a first phase difference correlation calculation value;
   an image signal processor (ISP) configured to perform a second correlation calculation for phase difference detection in the second direction using the phase difference information of the image data outputted from the image sensor; and
   a driver configured to adjust a focus of the camera based on the first phase difference correlation calculation value for the first direction and a second phase difference correlation calculation value for the second direction.

2. The electronic device of claim 1, wherein the first direction is perpendicular to a read-out direction for the plurality of image pixels, and the second direction is identical to the read-out direction of the plurality of image pixels.

3. The electronic device of claim 1, wherein each image pixel of the plurality of image pixels comprises a pixel structure having four photodiodes as light receiving elements (4PD pixel) including one micro-lens, with a first sub-pixel, a second sub-pixel, a third sub-pixel, and a fourth sub-pixel.

4. The electronic device of claim 3, wherein the first correlation calculation is performed through phase comparison according to a shift between adjacent pixels in the first direction for a first sub group of the first sub-pixel and the second sub-pixel, and a second sub group of the third sub-pixel and the fourth sub-pixel.

5. The electronic device of claim 3, wherein the ISP is configured to perform a re-mosaic function to re-align data output from the ISP, per 4PD pixel included in the plurality of image pixels.

6. The electronic device of claim 1, wherein the first correlation calculation is performed using a predetermined number of sampled line memories in the first direction.

7. The electronic device of claim 6, wherein image data output from the image sensor includes pixel data including color information about the plurality of image pixels, the first phase difference correlation calculation value for the first direction, and phase difference data including phase difference information for the second direction.

8. The electronic device of claim 7, wherein the image data output from the image sensor includes the first phase difference correlation calculation value for the first direction and the phase difference data including the phase difference information for the second direction at equal intervals between pixel data for the plurality of image pixels.

9. The electronic device of claim 7, wherein the second correlation calculation is performed by phase comparison of a shift in the second direction for a third sub group of a first sub-pixel and a third sub-pixel, and a fourth sub group of a second sub-pixel and a fourth sub-pixel, between adjacent pixels.

10. The electronic device of claim 1, wherein the driver is configured to adjust the focus of the camera by applying a weight through reliability comparison on each of the first phase difference correlation calculation value and the second phase difference correlation calculation value.

11. The electronic device of claim 1, wherein the first correlation calculation is performed on at least one of a portion corresponding to a region of interest (ROI) or an entire area of the plurality of image pixels.

12. A method for controlling an electronic device including a camera, an image sensor and at least one processor, the method comprising:
   performing, using an electrical signal converted from light incident on the image sensor, a first correlation calculation for phase difference detection in a first direction on a plurality of image pixels included in the image sensor, the image sensor being configured to collect the light incident on a lens, and the plurality of image pixels being arranged in the first direction and a second direction orthogonal to the first direction;
   outputting, by the image sensor to the at least one processor, image data including a first phase difference correlation calculation value for the first direction and phase difference data including phase difference information for the second direction;

performing, using the phase difference information of the image data outputted from the image sensor to the at least one processor, a second correlation calculation for phase difference detection in the second direction; and adjusting a focus of the camera based on the first phase difference correlation calculation value for the first direction and a second phase difference correlation calculation value for the second direction.

13. The method of claim 12, wherein the first direction is perpendicular to a read-out direction for the plurality of image pixels, and the second direction is identical to the read-out direction of the plurality of image pixels.

14. The method of claim 13, wherein each image pixel of the plurality of image pixels comprises a pixel structure having four photodiodes as light receiving elements (4PD pixel) including one micro-lens, with a first sub-pixel, a second sub-pixel, a third sub-pixel, and a fourth sub-pixel.

15. The method of claim 14, wherein the first correlation calculation is performed through phase comparison according to a shift between adjacent pixels in the first direction for a first sub group of the first sub-pixel and the second sub-pixel, and a second sub group of the third sub-pixel and the fourth sub-pixel.

16. The method of claim 15, wherein the first correlation calculation is performed using a predetermined number of sampled line memories in the first direction.

17. The method of claim 12, wherein image data output from the image sensor includes pixel data including color information about the plurality of image pixels.

18. The method of claim 17, wherein the image data output from the image sensor includes the first phase difference correlation calculation value for the first direction and the phase difference data including the phase difference information for the second direction at equal intervals between pixel data for the plurality of image pixels.

19. The method of claim 18, wherein the second correlation calculation is performed by phase comparison of a shift in the second direction for a third sub group of a first sub-pixel and a third sub-pixel and a fourth sub group of a second sub-pixel and a fourth sub-pixel, between adjacent pixels.

20. The method of claim 12, wherein adjusting the focus is implemented by applying a weight through reliability comparison on each of the first phase difference correlation calculation value and the second phase difference correlation calculation value.

* * * * *